(12) United States Patent  
LaGace et al.

(10) Patent No.: US 8,371,692 B2  
(45) Date of Patent: Feb. 12, 2013

(54) PINLESS HINGE FOR EYEWEAR

(75) Inventors: Danielle LaGace, Shawnee, KS (US); Leung Ka Shing, Yue Long (HK)

(73) Assignees: Micron Eyewear Manufactory Company Limited, Kwai Chung (HK); Bushnell Inc., Overland Park, KS (US)

( * ) Notice: Subject to any disclaimer, the term of this patent is extended or adjusted under 35 U.S.C. 154(b) by 253 days.

(21) Appl. No.: 12/914,361

(22) Filed: Oct. 28, 2010

(65) Prior Publication Data

US 2011/0096288 A1    Apr. 28, 2011

Related U.S. Application Data

(60) Provisional application No. 61/255,584, filed on Oct. 28, 2009.

(51) Int. Cl.  
    *G02C 5/12* (2006.01)
(52) U.S. Cl. ............................ 351/153; 351/113; 16/228
(58) Field of Classification Search .................. 351/153, 351/113, 114, 111, 116, 41; 16/228  
See application file for complete search history.

(56) References Cited

U.S. PATENT DOCUMENTS

| 2,941,268 | A | | 6/1960 | Morse | |
|---|---|---|---|---|---|
| 4,488,792 | A | * | 12/1984 | Wagner | 351/153 |
| 4,978,209 | A | * | 12/1990 | Ohba | 351/153 |
| 5,009,495 | A | * | 4/1991 | Williams | 351/153 |
| 5,781,273 | A | * | 7/1998 | Boden | 351/156 |
| 5,847,801 | A | | 12/1998 | Masunaga | |
| 6,231,181 | B1 | * | 5/2001 | Swab | 351/116 |

* cited by examiner

*Primary Examiner* — Hung Dang  
(74) *Attorney, Agent, or Firm* — Hovey Williams LLP

(57) ABSTRACT

Eyewear comprising a lens frame, at least one temple or ear piece, and at least one hinge. The hinge may be a substantially C-shaped wire with two end portions inserted through axially aligned pairs of holes formed into the lens frame and the temple. Alternatively, the hinge may be omitted and a hinge faceplate having a vertical rod portion integrally formed thereto may be coupled with the lens frame and the temple. Specifically, the temple may have a protrusion mating with a depression formed into the lens frame and the temple may have a depression formed therein mating with a rod end of the vertical rod portion, such that a portion of the temple is sandwiched between and rotatable relative to the vertical rod portion of the hinge faceplate and the lens frame.

12 Claims, 7 Drawing Sheets

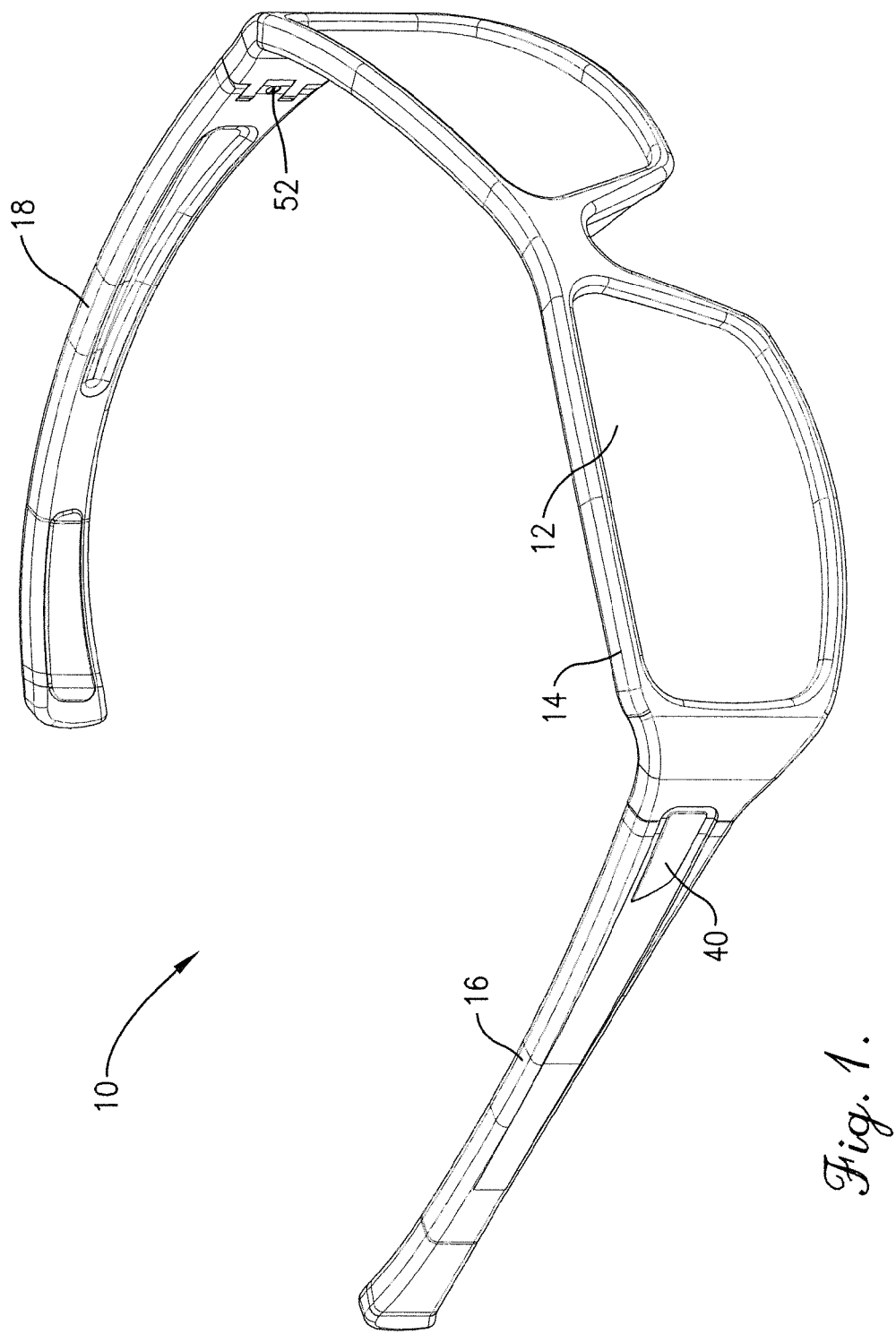

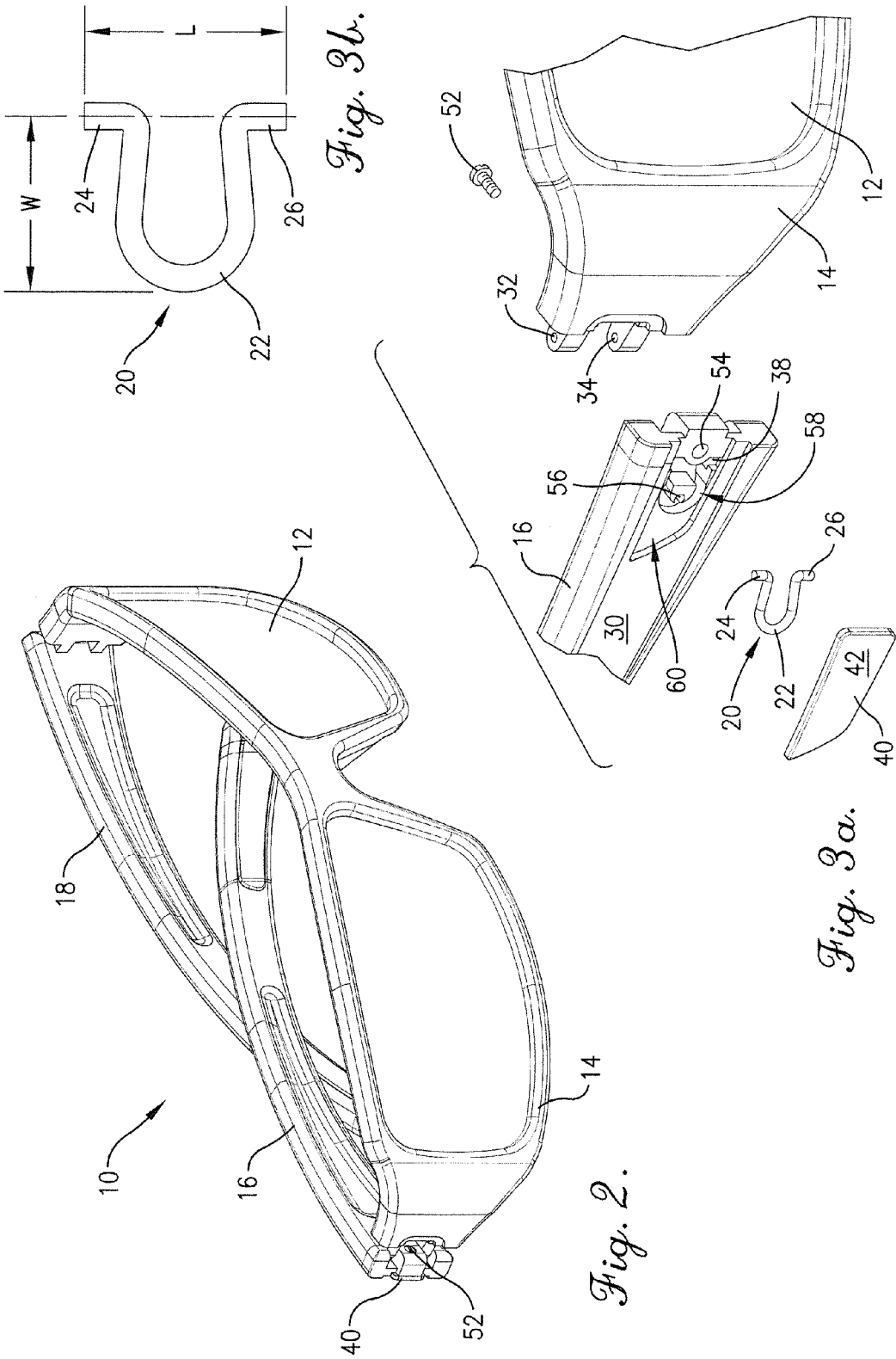

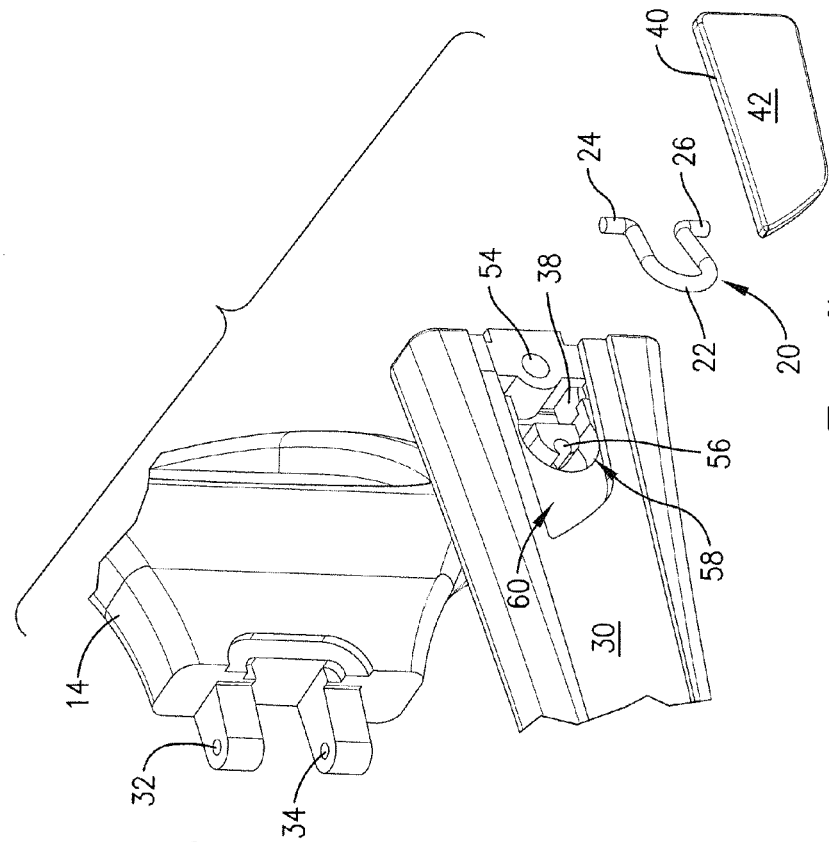
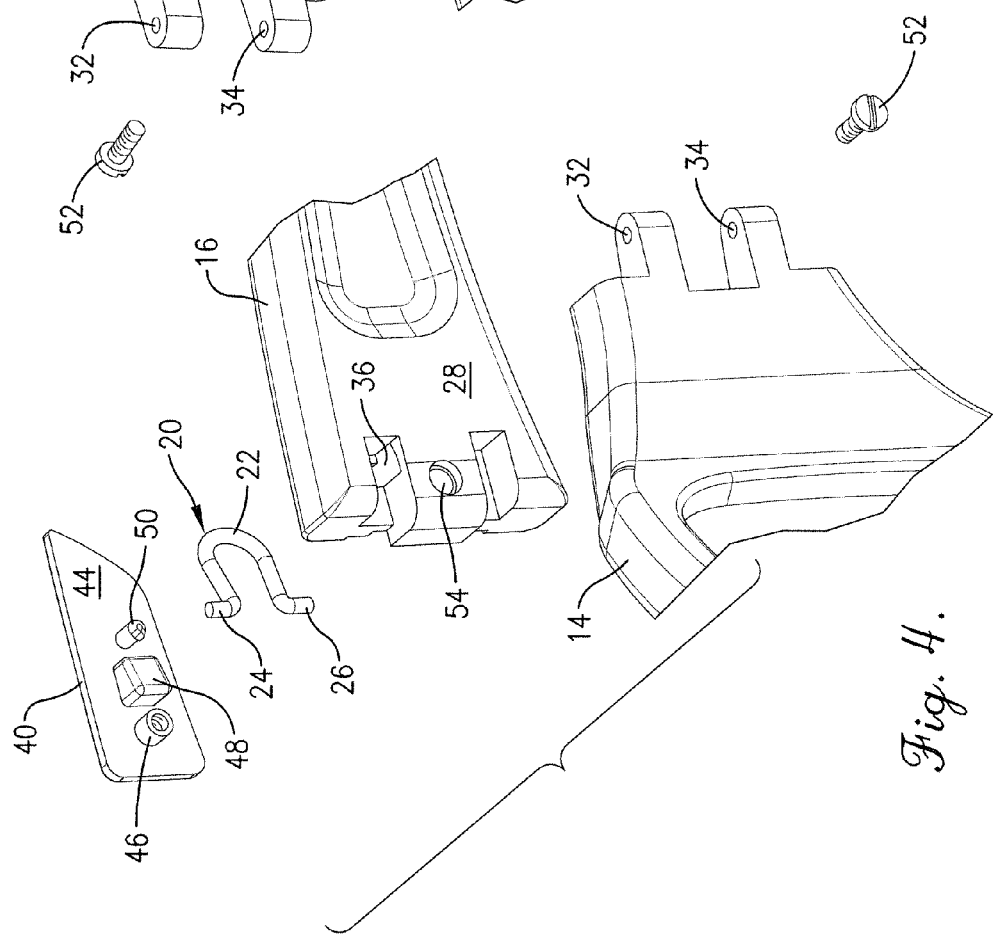

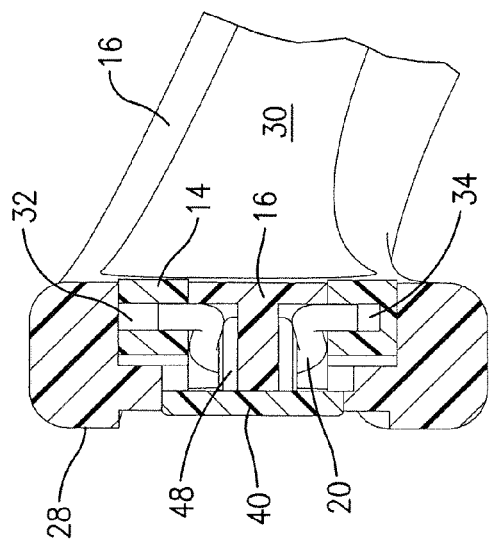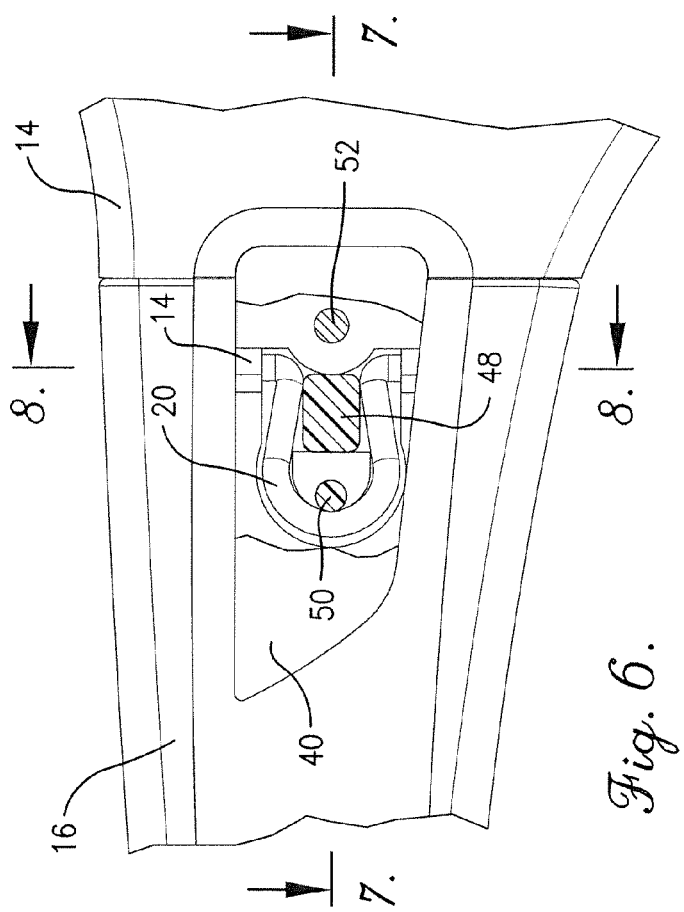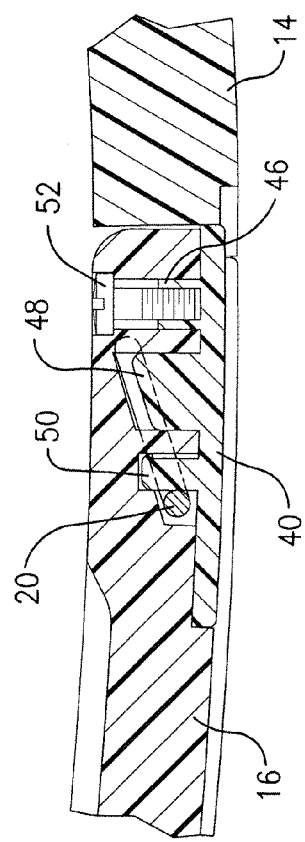

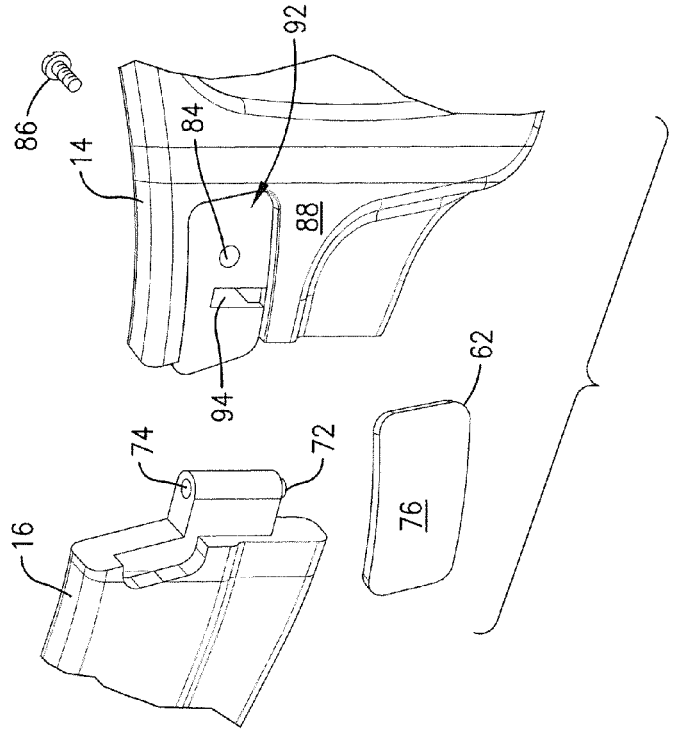
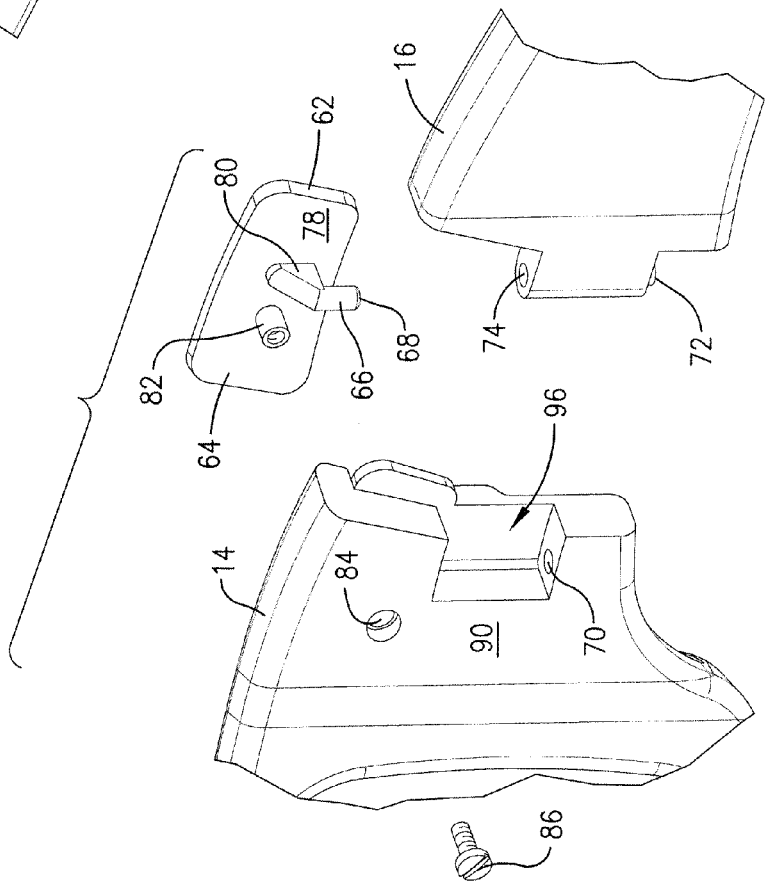

PINLESS HINGE FOR EYEWEAR

RELATED APPLICATIONS

This non-provisional patent application claims priority benefit with regard to all common subject matter of the earlier filed U.S. Provisional Patent Application titled "Pinless Hinge for Sunglasses", App. No. 61/255,584, filed on Oct. 28, 2009, which is hereby incorporated by reference in its entirety into the present application.

BACKGROUND

1. Field

Embodiments of the present invention relate to sunglasses and other eyewear. More particularly, embodiments of the invention relate to a hinge device for eyewear.

2. Related Art

Eyewear such as sunglasses or prescription glasses traditionally have two lenses, a lens frame to hold the lenses in place and to rest on a wearer's nose, and two temples, arms, or ear-pieces which rest on the wearer's ears. Most eyewear also include some sort of hinge between the lens frame and the temples allowing the temples to pivot toward the lens frame for storage and away from the lens frame for placement on the wearer's face.

Most eyewear hinges include straight, elongated pins or screws which are inserted through one or more holes in the lens frame and one or more holes in one of the temples. The temple may then pivot or rotate about the pin or screw toward and away from the lens frame. However, because these pins are typically thin and inexpensive, forces applied in a non-axial direction can cause them to break. Furthermore, elongated pins or screws may eventually become loose and fall out after being opened and closed many times.

Accordingly, there is a need for an eyewear hinge which overcomes the limitations described above.

SUMMARY

An embodiment of the invention is eyewear comprising a lens frame, at least one temple or ear piece, and a flexible member serving as a hinge about which the temple and/or the lens frame may pivot relative to each other. The lens frame may have a first pair of spaced apart holes formed therein. At least one of the temples may have an inner surface, an outer surface opposite the inner surface, and a second pair of spaced apart holes formed therein. The inner surface of the temple may face the lens frame and the outer surface of the temple may face away from the lens frame.

The flexible member may have a first end portion, a second end portion, and a curved portion disposed between the first and second end portions. The first end portion may be disposed in one of the first pair of holes and one of the second pair of holes while the second end portion is disposed in another one of the first pair of holes and another one of the second pair of holes. A faceplate may be attached to at least one of the temples and sandwich the flexible member between the faceplate and the temple.

In an alternative embodiment of the invention, the eyewear may comprise a lens frame, at least one temple, and a hinge faceplate fixed to the lens frame. The lens frame may have a front surface, a back surface opposite the front surface, and an indent or depression formed into the lens frame. The temple may also have a depression formed therein and may have a protrusion extending therefrom. The protrusion of the temple may rest within the depression of the lens frame. The hinge faceplate may comprise a flat portion and a vertical rod portion integrally formed with the flat portion. The vertical rod portion may extend through a vertical rod access hole in the lens frame and may comprise at least one rod end portion resting within the depression of the temple, such that a portion of the temple extending axially between the depression and the protrusion of the temple is sandwiched between the lens frame and the vertical rod portion of the hinge faceplate. The temple is thereby pivotable relative to the lens frame and hinge faceplate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

Embodiments of the present invention are described in detail below with reference to the attached drawing figures, wherein:

FIG. 1 is an isometric view of eyewear constructed according to various embodiments of the invention;

FIG. 2 is an isometric view of the eyewear of FIG. 1 with two temples thereof folded inward toward a lens frame of the eyewear;

FIG. 3a is a fragmentary exploded front isometric view of the eyewear of FIG. 1 illustrating a screw, a faceplate, and a flexible member configured for pivotally connecting one of the temples with the lens frame;

FIG. 3b is an elevation view of the flexible member of FIG. 3a illustrating its length and width;

FIG. 4 is a fragmentary exploded back isometric view of the eyewear of FIG. 3a;

FIG. 5 is a fragmentary exploded side isometric view of the eyewear of FIG. 3a;

FIG. 6 is a fragmentary, cutaway side view of the eyewear of FIG. 3a with the flexible member installed between the faceplate and the temple;

FIG. 7 is a fragmentary, cross-sectional top view of the faceplate, lens frame, and temple taken along line 7-7 in FIG. 6;

FIG. 8 is a fragmentary, cross-sectional front view of the faceplate, temple, and flexible member taken along line 8-8 in FIG. 6;

FIG. 10 is a fragmentary exploded front isometric view of the eyewear of FIG. 9 illustrating a hinge faceplate, a screw, a temple, and a lens frame thereof;

FIG. 11 is a fragmentary exploded back isometric view of the eyewear of FIG. 10;

Figure 9:
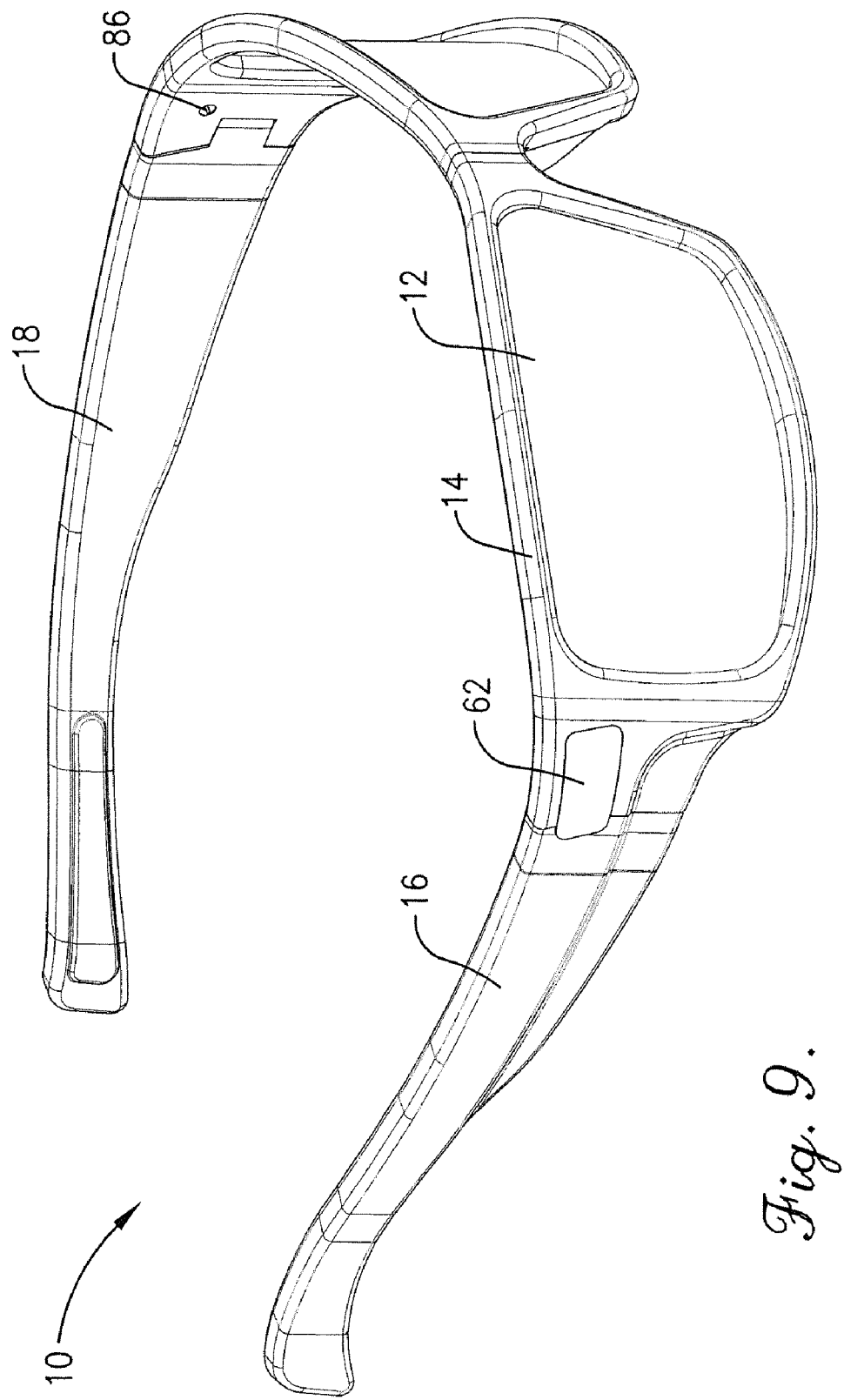
FIG. 9 is an isometric view of eyewear constructed according to various alternative embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Various embodiments of the invention, as illustrated in FIGS. 1-14, comprise eyewear 10, such as sunglasses. In some embodiments of the invention, as illustrated in FIGS. 1-8, the eyewear 10 may comprise one or two lenses 12, a lens frame 14, one or more temples 16,18, and one or more curved flexible members 20. The temples 16,18 may each pivot relative to the lens frame 14 between a folded and an unfolded position about a portion of one of the flexible members 20.

The lenses 12 are conventional and may be plastic, glass, and/or other at least partially transparent materials which allow at least a portion of light to pass therethrough. The lens frame 14 is also conventional and may be sized and configured to secure the lenses 12 in fixed, spaced-apart relation with each other. In some embodiments of the invention, at least a portion of the lens frame 14 may extend between the lenses 12 and provide a surface configured to rest on a person's nose.

The temples 16,18 may comprise a first temple 16 and a second temple 18. The temples 16,18 may be elongated arms each having an inner surface 28 substantially facing the lens frame 14 and an outer surface 30 substantially facing away from the lens frame 14. The temples 16,18 may each extend from opposing ends of the lens frame 14 to or past a person's ears when the lens frame is resting on the person's nose. For example, the first and second temples 16,18 may be pivotally attached to opposing ends of the lens frame 14 such that the temples 16,18 may pivot between an unfolded position, as illustrated in FIG. 1, and a folded position, as illustrated in FIG. 2.

As illustrated in FIGS. 3a, 4, and 5, opposing ends of the lens frame 14 may comprise a first pair of spaced apart and/or axially-aligned holes 32,34 formed therein, and one end of each of the temples 16,18 may comprise a second pair of spaced apart and/or axially aligned holes 36,38 formed therein. The holes 32-38, as described herein, may be openings of any shape or size formed through the lens frame 14 or the temples 16,18. For example, at least some of the holes 32-38 may be substantially cylindrical passageways formed through the lens frame 14 and/or the temples 16,18. Alternatively, the holes 32-38 may be square openings or openings of other geometric shapes formed through the temples 16,18 and/or the lens frame 14. In other alternative embodiments of the invention, one or more of the holes 32-38 may be formed to extend only partially through the temples 16,18, and/or the lens frame 14, such that at least one of the holes 32-38 is closed at one of its ends. In some embodiments of the invention, the space between the first pair of holes 32,34 may be slightly greater than the space between the second pair of holes 36,38 or vice versa, such that during assembly, the first pair of holes 32,34 may be positioned to axially align with the second pair of holes 36,38. The temples 16,18 may be pivotally attached to the lens frame 14 by inserting portions of the flexible member 20 into at least one of the holes 32-38, as described below.

As illustrated in FIGS. 3a and 3b, the flexible member 20 may be made of wire or any other resilient material and may be substantially C-shaped, omega symbol-shaped, horseshoe-shaped, and/or U-shaped. The flexible member 20 may have a curved portion 22 extending between first and second end portions 24,26. The curved portion 22 may be substantially U-shaped or C-shaped and may curve outwards relative to an axis extending through at least part of each of the first and second portions 24,26. The first and second end portions 24,26 may each be angled at least slightly outward away from the curved portion 22 in opposite directions from each other. For example, the flexible member 20 may be shaped similar to an omega symbol having a curved center portion and two end portions extending outward at the ends of the curved center portion.

The flexible member 20 may be compressed such that the two end portions 24,26 are moved closer to each other than when the flexible member 20 is in a naturally-biased, uncompressed state. The flexible member 20 may also be extended such that the two end portions 24,26 are moved further away from each other. In some embodiments of the invention, a length L of the flexible member 20, defined as a lateral distance from the first end portion 24 to the second end portion 26 thereof, may be greater than a width W of the flexible member 20, as illustrated in FIG. 3b. In other embodiments of the invention, the length L may be approximately equal to the width W of the flexible member 20. In alternative embodiments of the invention, the length L may be greater than the width W. However, a shorter width W may result in better spring action of the flexible member 20, thus providing greater force to spring back to the naturally-biased state of the flexible member 20.

The spacing of both pairs of holes 32-38 may be such that when the flexible member 20 is compressed, the end portions 24,26 may fit between the two holes of each of the pairs of holes 32-38, and when released from its compressed state, the end portions 24,26 may spring outward and/or be forcibly biased slightly outward into the holes 32-38 of each pair. For example, the first end portion 24 may be inserted into a first hole 32 of the first pair and a first hole 36 of the second pair while the second end portion 26 is inserted into a second hole 34 of the first pair and a second hole 38 of the second pair. The outward biasing of the first and second end portions 24,26 may serve to keep the flexible member 20 in place, while the holes 32-38 are sized slightly larger than a diameter of the first and second end portions 24,26, thus allowing the temple 16,18 to rotate relative to the lens frame 14.

In some embodiments of the invention, the curved portion 22 between the first and second end portions 24,26 of the flexible member 20 may be substantially fixed to its corresponding temple 16,18 or the lens frame 14 and/or otherwise prevented from rotating relative to the temple 16,18 or the lens frame 14. For example, as illustrated in FIGS. 1-8, a faceplate 40 may be attached to each of the temples 16,18 adjacent to the flexible member 20 and may prevent the flexible member 20 from rotating relative to its corresponding temple 16,18.

The faceplate 40 may have a front surface 42 and an opposing back surface 44. The faceplate 40 may comprise an attachment receptacle 46, a biasing protrusion 48, and a secondary attachment protrusion 50 extending from and/or formed into its back surface 44, as illustrated in FIG. 4. The attachment receptacle 46 may be a substantially hollow cylindrical protrusion configured for receiving a mechanical attachment, such as a screw 52, therein. For example, the screw 52 may first extend through an attachment hole 54 formed through one of the temples 16,18 and then further extend into and mechanically attach to the attachment receptacle 46, thus attaching the faceplate 40 to the temple 16,18 and sandwiching the flexible member 20 therebetween. In some embodiments, an inner surface of the attachment receptacle 46 may comprise threads formed therein to mate with threads of the screw 52.

The biasing protrusion 48 may be configured to rest between the end portions 24,26 of the flexible member 20. The biasing protrusion 48 may prevent the flexible member 20 from being compressed and disengaging with the axially spaced holes 32-38 of the temples 16,18 and/or the lens frame 14. Additionally or alternatively, the biasing protrusion 48 may press the end portions 24,26 outwards in the extended configuration such that the end portions 24,26 of the flexible member 20 are pressed by the biasing protrusion 48 into their respective holes 32-38 of the temples 26,28 and lens frame 14, respectively. The biasing protrusion 48 may have any shape and may be sized to fit snugly between the first and second end portions 24,26. In some embodiments of the invention, the biasing protrusion 48 may be substantially square or rectangular with substantially rounded edges. Furthermore, the biasing protrusion 48 may have a surface that is substantially ramped or angled between at least some of its rounded edges, as illustrated in FIG. 7.

The secondary attachment protrusion 50 may be configured to slide into or nest inside a guide hole 56 formed in one or each of the temples 16,18. In some embodiments of the invention, the guide hole 56 may be a cavity or C-shaped channel formed in each of the temples 16,18 and configured for mating with the secondary attachment protrusion 50. This secondary attachment protrusion 50 may, along with the screw 52 attached to the attachment receptacle 46, cooperatively assist in properly aligning the faceplate 40 relative to its corresponding temple 16,18. The curved portion 22 of the flexible member 20 may be placed against one of the temples 16,18 such that it at least partially curves around the secondary attachment protrusion 50 and/or its corresponding guide hole 56.

In some embodiments of the invention, as illustrated in FIGS. 3a and 5, the temples 16,18 may have a C-shaped channel or C-shaped cavity 58 formed therein such that the flexible member 20 may be nested within the C-shaped cavity 58 so that the back surface 44 of the faceplate 40 may rest substantially flush with the outer surface 30 of at least one of the temples 16,18. Additionally, a faceplate cavity 60 may be formed into the temples 16,18 such that the faceplate 40 may nest therein and the front surface 42 of the faceplate 40 may be flush with the outer surface 30 of at least one of the temples 16,18. Furthermore, the C-shaped cavity 58 may be nested within the faceplate cavity 60, as illustrated in FIG. 5.

In an alternative embodiment of the eyewear 10, as illustrated in FIGS. 9-14, the flexible member 20 may be omitted and/or replaced with a hinge faceplate 62 having a substantially flat portion 64 and a vertical rod portion 66 integrally formed thereto having at least one rod end portion 68. In some embodiments of the invention, the flat portion 64 of the hinge faceplate 62 may be substantially flat or at least slightly contoured and may have a thickness generally less than a thickness of the temples 16,18. The vertical rod portion 66 may be a substantially elongated rod having a length-wise axis that is substantially perpendicular relative to a direction of thickness of the flat portion 64.

As illustrated in FIGS. 10-14, the lens frame 14 may have an indent, cavity, or depression 70 configured to axially align and mate with a protrusion 72 extending from one of the temples 16,18. The temples 16,18 in this configuration may also each comprise an indent, cavity, or depression 74 axially aligned with the protrusion 72 and configured to axially align and mate with the rod end portion 68 of the hinge faceplate 62. The depressions 70, 74 may each form hollow cavities which are substantially round, hemispherical, cylindrical, conical, or any configuration such that the protrusion 72 and/or the rod end portion 68 may rotatably move therein. In some embodiments of the invention, the protrusion 72 and/or the rod end portion 68 may be shaped to match the at least one of the depressions 70,74. For example, the protrusion 72 and/or the rod end portion 68 may be round, hemispherical, cylindrical, conical, etc.

The hinge faceplate 62 may further comprise a front surface 76 and an opposing back surface 78. The vertical rod portion 66 may extend from the back surface 78 of the hinge faceplate 62. The vertical rod portion 66 may extend downward from an angled or substantially triangular base 80 that is integral with and extends out from the back surface 78 of the hinge faceplate 62. Furthermore, the hinge faceplate 62 may comprise an attachment receptacle 82 extending from its back surface 78 and configured to align with an attachment hole 84 formed through the lens frame 14. A mechanical attachment device, such as a screw 86, may extend through the attachment hole 84 and into the attachment receptacle 82. Threads on the screw 86 may mate with threads inside the attachment receptacle 82 to fix the hinge faceplate 62 to the lens frame 14. For example, the hinge faceplate 62 may be fixedly attached to the lens frame 14 by the screw 86 extending substantially horizontally through the lens frame 14 at a substantially right degree angle relative to the vertical rod portion 66 of the hinge faceplate 62.

As illustrated in FIGS. 10-14, the lens frame 14 may have a front surface 88 and an opposing back surface 90, with a hinge faceplate cavity 92 formed into the front surface 88 thereof and a vertical rod access hole 94 formed through the lens frame 14. The flat portion 64 of the hinge faceplate 62 may rest within the hinge faceplate cavity 92 and the front surface 76 of the hinge faceplate 62 may rest flush with the front surface 88 of the lens frame 44. The vertical rod access hole 94 may extend from a point within the hinge faceplate cavity 92 on the front surface 88 of the lens frame 14 and on through to the back surface 90 of the lens frame 14. The vertical rod access hole 94 may be any shaped opening formed through the lens frame 14 and may be sized and configured to allow the vertical rod portion 66 of the hinge faceplate 62 to be inserted therethrough.

Figure 14:
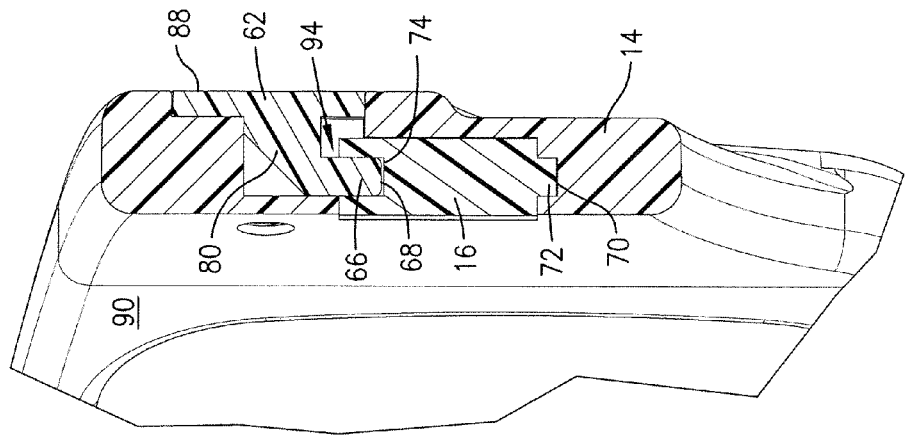
FIG. 14 is a fragmentary, cross-sectional front view of the hinge faceplate, temple, and lens frame taken along line 14-14 in FIG. 12.
Figure 12:
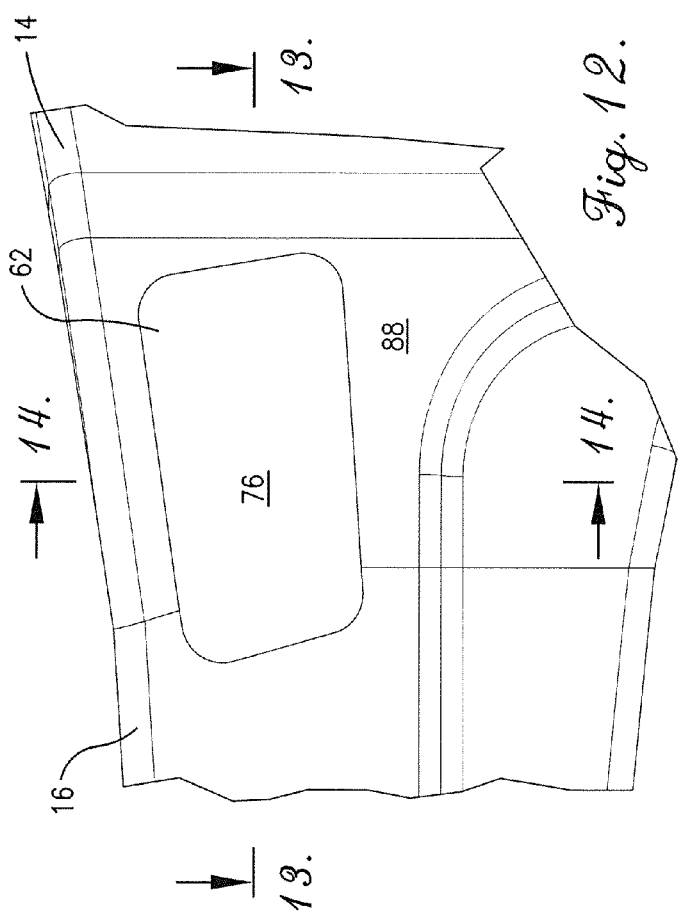
FIG. 12 is a fragmentary side view of the hinge faceplate, temple, and lens frame of FIG. 10.
Figure 13:
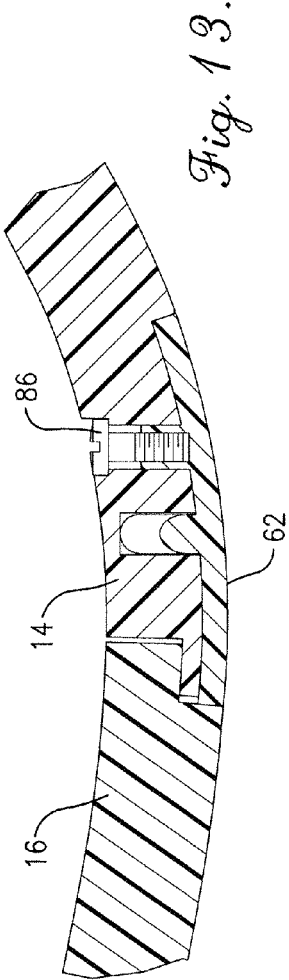
FIG. 13 is a fragmentary, cross-sectional top view of the hinge faceplate, screw, temple, and lens frame taken along line 13-13 in FIG. 12.

The lens frame 14 may further have a temple cavity 96 formed into the back surface 90 thereof and configured for receiving a portion of one of the temples 16,18 that extends laterally from the protrusion 72 and the depression 74 of the temples 16,18, as illustrated in FIG. 14. Furthermore, the depression 70 of the lens frame 14 may be formed within the temple cavity 96 and at least part of the vertical rod portion 66 of the hinge faceplate 62 may extend from the vertical rod access hole 94 into the temple cavity 96.

Once the rod end portion 68 of the hinge faceplate 62, the depression 70 of the lens frame 14, the protrusion 72 of at least one of the temples 16,18, and the depression 70 of at least one of the temples 16,18 are all axially aligned with each other, the screw 86 or another attachment device or attachment material may be used to secure the hinge faceplate 62 to the lens frame 14. In this embodiment, a portion of one of the temples 16,18 that extends laterally from the protrusion 72 and the depression 74 of the temples 16,18 is sandwiched between the hinge faceplate 62 and the lens frame 14, but is not screwed directly thereto. This embodiment of the invention, as illustrated in FIGS. 9-14, is less susceptible to the temple breaking off than prior art versions because the temples 16,18 do not pivot about a screw or pin, but rather pivot about an integral portion of the temples 16,18 extending between the protrusion 72 and the depression 74.

Although the invention has been described with reference to the preferred embodiment illustrated in the attached drawing figures, it is noted that equivalents may be employed and substitutions made herein without departing from the scope of the invention as recited in the claims. For example, the flexible member 20, the hinge faceplate 62, and/or corresponding components described herein may operate as a hinge for mechanically and pivotally connecting other portions of eyewear. In some alternative embodiments of the invention, the eyewear may comprise temples which each have multiple elongated portions pivotally connected with each other by way of the flexible member 20, the hinge faceplate 62, and/or corresponding components described herein. Additionally or alternatively, the lens frame may be made of two separate portions which are pivotally connected with each other at a point substantially between the lenses by way of the flexible member 20, the hinge faceplate 62, and/or corresponding components described herein. In general, any first apparatus may be pivotally joined with any second apparatus using the hinge arrangements described herein, and these designs are not merely limited to eyewear.

Having thus described various embodiments of the invention, what is claimed as new and desired to be protected by Letters Patent includes the following:

1. Eyewear comprising:
   a lens frame having a first pair of spaced apart holes formed therein,
   a temple having an inner surface, an outer surface opposite the inner surface, and a second pair of spaced apart holes formed therein, wherein the inner surface of the temple faces the lens frame and the outer surface of the temple faces away from the lens frame; and
   a hinge comprising:
      a curved flexible member having:
         a first end portion disposed in one of the first pair of holes and one of the second pair of holes;
         a second end portion disposed in another one of the first pair of holes and another one of the second pair of holes; and
         a curved portion between the first end portion and the second end portion,
      wherein at least one of the temple and the lens frame is pivotable or rotatable about the flexible member.

2. The eyewear of claim 1, wherein the flexible member is movable between a compressed position in which the first and second end portions are a first distance away from each other and an uncompressed position in which the first and second end positions are a second greater distance away from each other.

3. The eyewear of claim 2, wherein the end portions are substantially axially aligned with each other in at least one of the compressed and uncompressed positions.

4. The eyewear of claim 1, wherein the curved portion is fixedly secured to at least one of the temple and the lens frame.

5. The eyewear of claim 1, wherein the first end portion is angled in an opposite direction away from the second end portion.

6. The eyewear of claim 1, wherein the curved portion is substantially c-shaped, omega symbol-shaped, horseshoe shaped, or U-shaped.

7. The eyewear of claim 1, further comprising a faceplate having a front surface and a back surface, wherein the back surface of the faceplate is configured to mate with the outer surface of the temple such that the curved portion of the flexible member rests between the faceplate and the temple.

8. The eyewear of claim 7, wherein the faceplate further comprises an attachment receptacle extending from the back surface of the faceplate and configured to receive and attach to a mechanical attachment extending through the temple.

9. The eyewear of claim 7, wherein the faceplate further comprises a biasing protrusion extending from the back surface of the faceplate and positioned between the first and second end portions of the flexible member such that the biasing protrusion prevents the end portions from compressing toward each other.

10. The eyewear of claim 7, wherein a guide hole or channel is formed into the outer surface of the temple proximate a location of the flexible member, wherein the faceplate further comprises a secondary attachment protrusion extending from the back surface of the faceplate and mated with the guide hole or channel formed in the temple.

11. The eyewear of claim 1, wherein the holes of at least one of the first pair of spaced apart holes and the second pair of spaced apart holes are axially aligned with each other.

12. Eyewear comprising:
    a lens frame having a first pair of spaced apart holes formed therein,
    a temple having an inner surface, an outer surface opposite the inner surface, and a second pair of spaced apart holes formed therein, wherein the inner surface of the temple faces the lens frame and the outer surface of the temple faces away from the lens frame;
    a hinge comprising:
       a curved flexible member having:
          a first end portion disposed in one of the first pair of holes and one of the second pair of holes;
          a second end portion disposed in another one of the first pair of holes and another one of the second pair of holes; and
          a curved portion between the first end portion and the second end portion,
       wherein at least one of the temple and the lens frame is pivotable or rotatable about the flexible member;
    a faceplate having a front surface and a back surface, wherein the back surface of the faceplate is configured to mate with the outer surface of the temple such that the curved portion of the flexible member rests between the faceplate and the temple; and
    a mechanical fastener extending through the temple and attached to the faceplate.

\* \* \* \* \*